Feb. 15, 1938.　　　　　J. S. SHARPE　　　　　2,108,082
TRANSMISSION MECHANISM
Filed July 20, 1936　　　　4 Sheets-Sheet 3
Fig. 3.
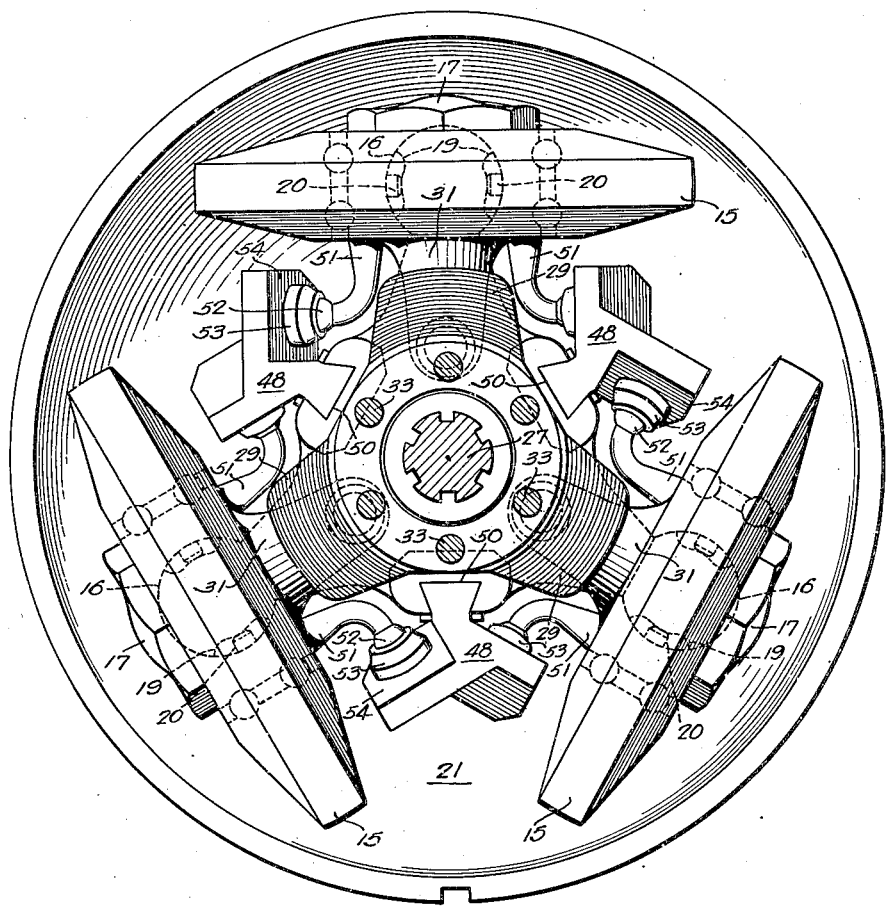
Fig. 5.　　　Fig. 6.　　　Fig. 7.
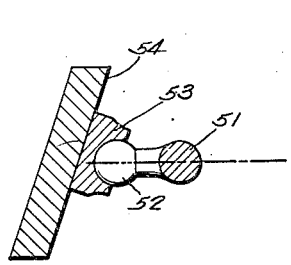 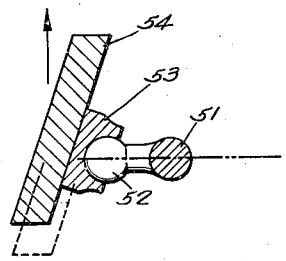 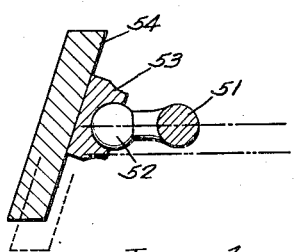
Inventor:
John S. Sharpe
by his Attorneys
Howson & Howson Feb. 15, 1938. J. S. SHARPE 2,108,082
TRANSMISSION MECHANISM
Filed July 20, 1936 4 Sheets-Sheet 4

Patented Feb. 15, 1938

2,108,082

UNITED STATES PATENT OFFICE 2,108,082

TRANSMISSION MECHANISM

John S. Sharpe, Haverford, Pa.

Application July 20, 1936, Serial No. 91,601

10 Claims. (Cl. 74—281)

This invention relates to transmission mechanisms, and more particularly to variable transmissions of the rolling adhesion type employing planetary torque-transmitting rollers operating in toric races and adjustable with respect to said races to afford differing ratios of speed and torque between the input and output elements of the transmission. A transmission of this general character is disclosed in my United States Patent Number 1,978,439, and in my pending United States application Serial Number 741,468.

In transmissions of this character, the biaxial movement of the rollers required for their planetary function sets up severe gyroscopic torques which tend to displace the rollers from their normal function positions in the toroidal races, as hereinafter more specifically set forth, and this gyroscopic torque may so materially exceed in magnitude the torques which the mechanism is designed to transmit through or by the rollers that the pressures required to maintain a state of rolling adhesion free from slippage must be greatly increased beyond those otherwise required for the normal power-transmitting function. This requirement for increased pressures presents extremely difficult structural problems.

It has been proposed as a means for avoiding these difficulties to neutralize the gyroscopic torques by means of centrifugal forces applied through the medium of weights suitably mounted in the rotary structure. The prior methods of applying centrifugal force for this purpose, however, are inadequate for that type of rolling adhesion transmission wherein the torques from the power source are introduced into the transmission mechanism directly through the planetary rollers. A principal object of the present invention, therefore, is to provide for this latter type of transmission an effective means whereby the centrifugal force may be utilized to neutralize the gyroscopic torques referred to.

More specifically, an object of the invention is to provide a gyroscopic-torque neutralizing device of the stated character wherein the centrifugal forces are continuously substantially in direct ratio to the gyroscopic torques for all the variable conditions under which the transmission functions.

The invention will be more readily understood by reference to the attached drawings, wherein:

Fig. 3 is a section on the line 3—3, Fig. 2;

Figure 1:
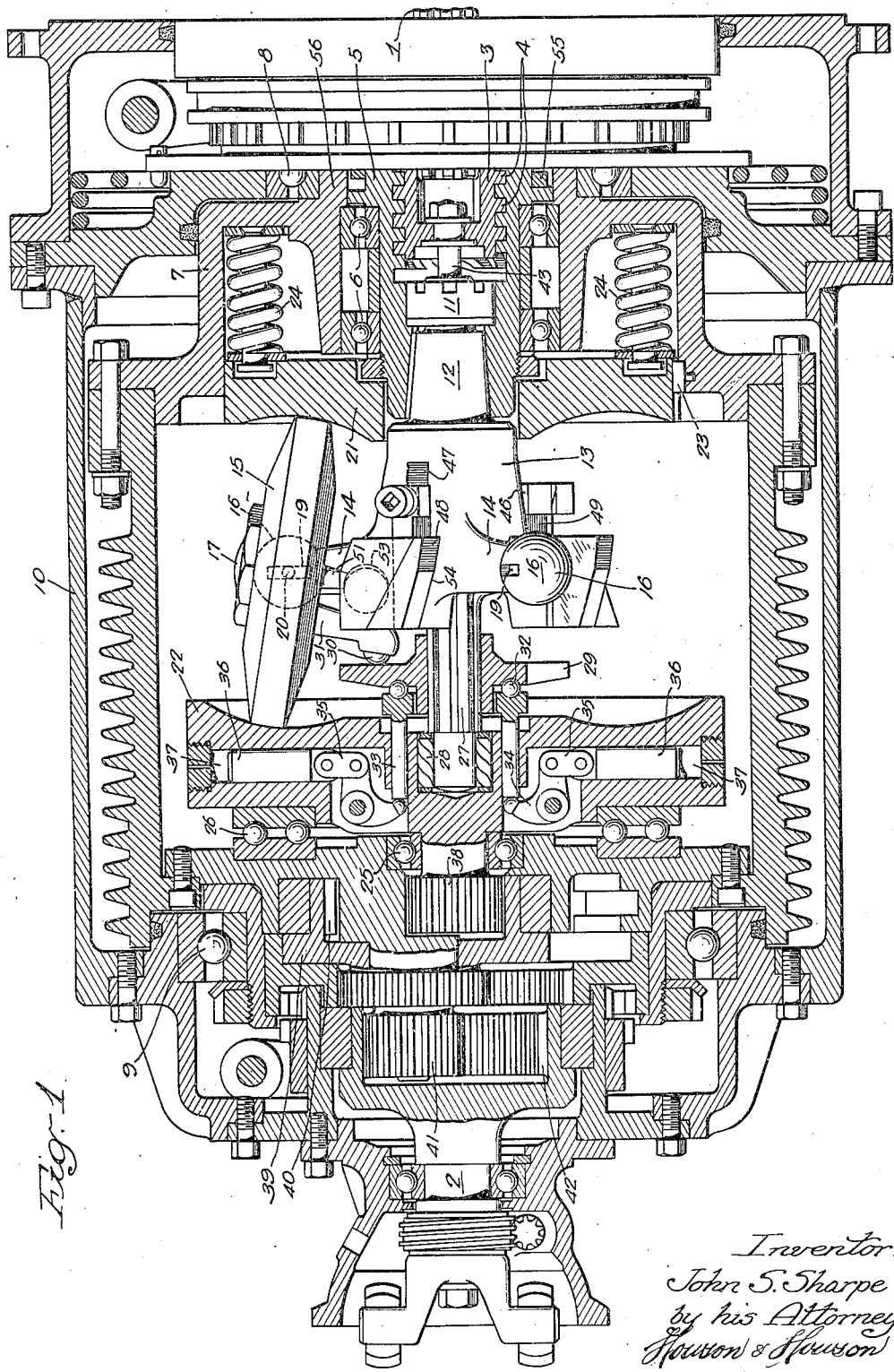
Figure 1 is a longitudinal sectional view of a transmission made in accordance with my invention.

Figs. 5, 6, and 7 are fragmentary sectional views illustrating the mode of operation of the planetary-adjusting means.

With reference to the drawings, 1 is the driving or input shaft, and 2 the output or driven shaft of the transmission. In the present instance, the shaft 1 is splined in the interior of a hollow shaft element 3, which latter is provided exteriorly with threads 4 which engage corresponding threads formed in the interior of a hollow shaft element 5. The member 5 is journaled in bearings 6 in a rotary housing 7, which housing in turn is mounted for rotation on bearings 8 and 9 within the fixed casing 10. The shaft element 5 is fixed axially, while the element 3 is capable of axial movement, which axial movement results from a rotation of this element relative to the element 5 by reason of the threaded connection therebetween.

Figure 2:
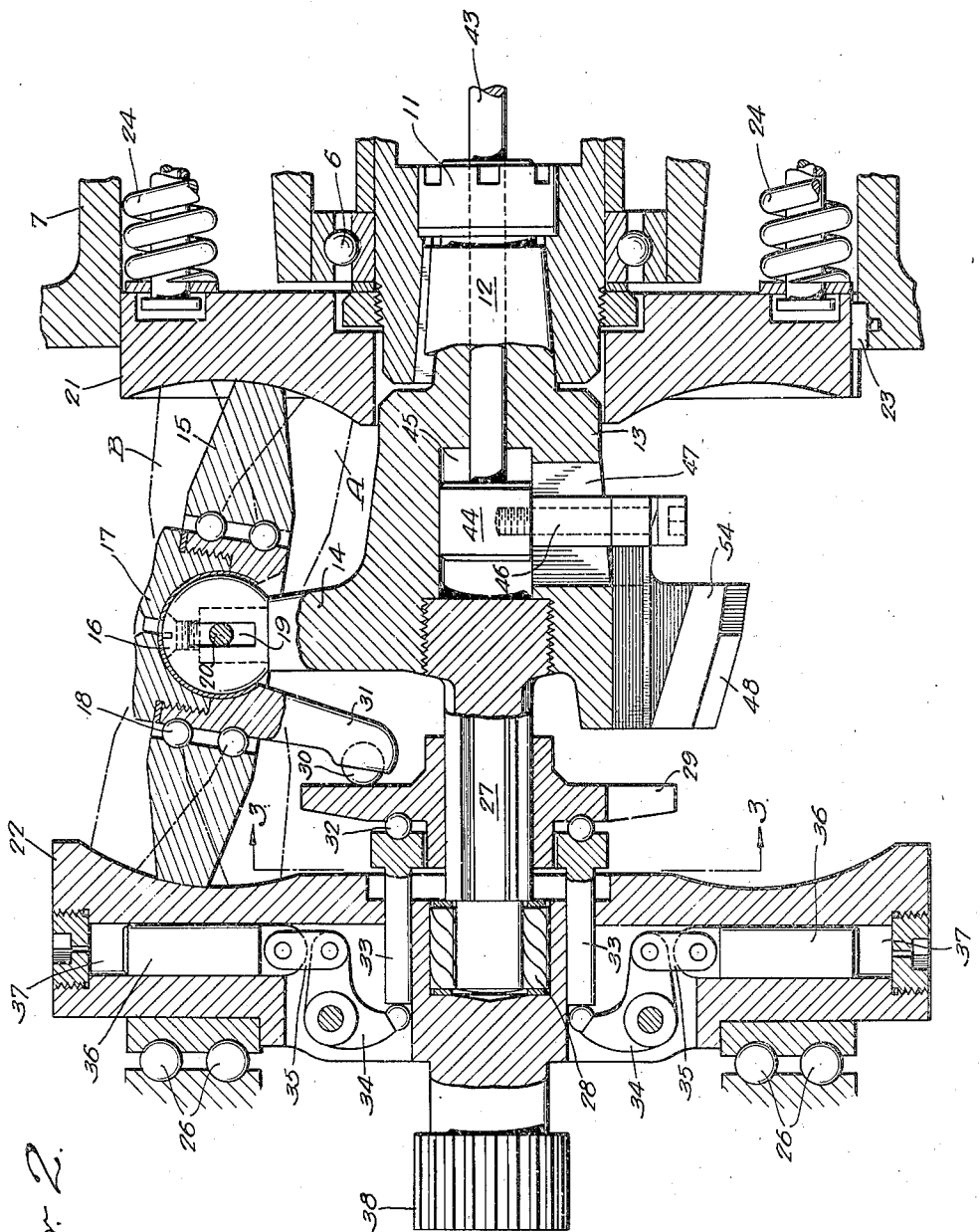
Fig. 2 is an enlarged fragmentary sectional view.

Fitting in and secured to the inner end of the shaft element 5 through the medium of a nut 11 is the tapered extremity 12 of a member 13, which member has radially projecting arms 14 upon which are mounted planetary rollers 15. Each of the arms 14 has a spherical extremity 16 upon which is journaled a roller carrier 17, and anti-friction bearings 18 are interposed between the rollers 15 and their carriers 17. Each of the spherical extremities 16 is provided at opposite sides with a radial slot 19 which receive pins 20 projecting from the carriers 17. As shown in Figs. 2 and 3, these pins restrict the movement of the carriers 17 on the spheres 16 in obvious manner. They permit adjustment of the rollers 15 between the extreme positions indicated in broken lines in Fig. 2 and designated respectively A and B. They also permit limited adjustment of the rollers 15 about an axis transverse to their normal axis of rotation, as will hereinafter be described.

The rollers 15 operate in a toroidal space formed between members 21 and 22. The member 21 is mounted in the housing 7 to which it is secured by means of a key 23. The key 23 while preventing relative rotation between the member 21 and the housing 7 permits a movement of the member 21 in the axial direction, and springs 24 are provided between the housing and the member 21 which resiliently urge the member 21 against the rollers 15. The mounting of the shaft element 5 and of the associated elements is such that the pressure imposed upon the roller by the member 21 is transmitted through the rollers to the member 22. This member is mounted for rotation in the housing 7 upon bearings 25, and between the housing and the back of the member 22 are interposed anti-friction thrust bearings 26. It will be apparent, therefore, that the rollers 15 are confined under pressure of the springs 24 between the members 21 and 22.

The member 13 has an axial shaft extension 27 the extremity of which is journaled in bearings 28 in the member 22. The intermediate portion of the extension 27 carries a flanged member 29, which is splined to the extension, and one face of this member engages through the medium of an anti-friction bearing 30 the end of an arm 31 which projects inwardly from the roller carriers 17. The opposite side of the member 29, also through the medium of anti-friction bearings 32, is engaged by a plurality of plungers 33 mounted in the member 22 for movement in the axial direction. The opposite end of each of the plungers is engaged by one arm of a bell crank lever 34 pivotally supported in the member 22, the other arm of the bell crank lever being connected through a link 35 with the inner end of a weight 36 which is slidably guided in a radial recess 37 in the member 22. The functions of the weights 36 and of the associated elements will be described hereinafter.

The member 22 carries a pinion 38 which constitutes an element of a geared planetary mechanism which forms an operative connection between the rolling adhesion unit previously described and the driven shaft 2. This geared unit and its function is illustrated and described in detail in my aforesaid copending application, Serial Number 741,468, and forms no part of the present invention. It is sufficient to state that this mechanism comprises a planetary member 39 which is journaled in an eccentric position upon the housing 7 and which comprises a plurality of gear elements including an annular or internal gear 40 meshing with the pinion 38 and a pinion 41 which meshes with an internal gear 42 on the driven shaft 2.

As previously set forth, the rollers 15 are adjustable between the two positions shown in broken lines in Fig. 2 and designated respectively A and B. When the rollers 15 are in the A position, the speed ratio betwen the input and output shafts is at a maximum, as also is the torque transmitted to the output shaft; and when the rollers 15 are in the B position, the speed and torque ratios are unity. In this latter position of the rollers, the rotary parts including the input and output shafts 1 and 2, the housing 7, the members 21 and 22, the rollers 15 and the elements of the geared planetary unit are in effect locked together and rotate as a unit about the principal axis of the mechanism corresponding in the present instance to the common axis of the input and output shafts.

Figure 4:
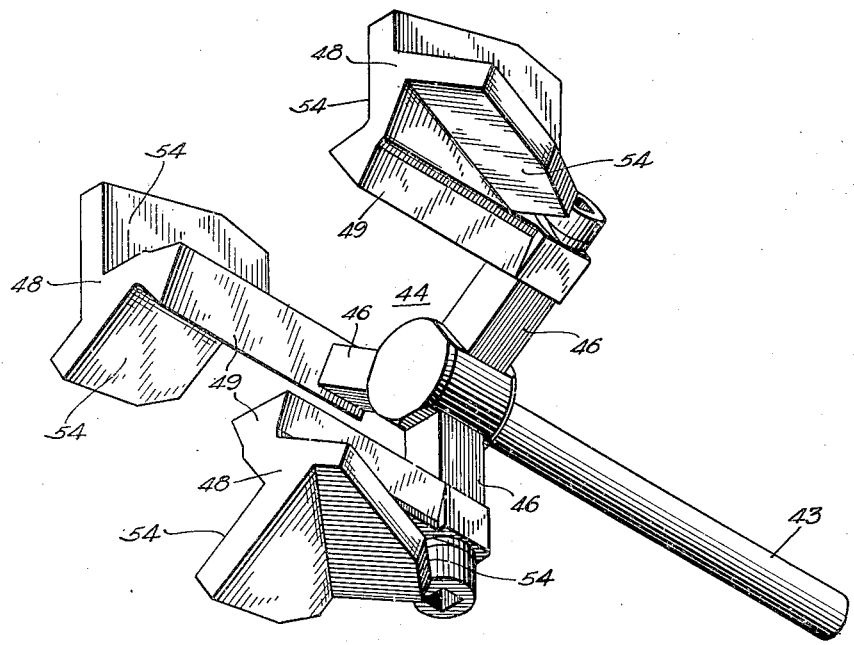
Fig. 4 is a view in perspective of the roller-adjusting element.

The adjustment of the rollers 15 between the A and B positions is effected by precessional movement of the rollers in the toroidal race, and this precessional movement in initiated by adjustment of the rollers about an axis extending through the points of contact thereof with the members 21 and 22. This latter adjustment of the rollers is effected in the present instance through the medium of a rod 43 which extends axially through the tapered extremity 12 of the member 13, see Fig. 2. The outer end of this rod, as shown in Fig. 1, is connected to the shaft element 3, and its inner end is provided with a cylindrical head 44 slidably mounted in a counterbore 45 in the member 13. The head 44, as best shown in Fig. 4, comprises radially extending arms 46 which project through slots 47 in the member 13, see Figs. 1 and 2. To the outer end of each of these arms is secured a cam element 48 comprising a dovetailed section 49, which as shown in Fig. 3 fits slidably in an axially extending dovetailed recess 50 in the member 13. Extending from each of the roller carriers 17 as shown in Fig. 3 and at opposite sides thereof are arms 51, 51 having spherical tips 52 which fit in spherical sockets in shoe elements 53, and the shoes 53 associated with each pair of arms 51 engage the oppositely disposed faces 54 of each adjoining pair of cams 48. These opposed faces 54 are parallel to each other but occupy planes extending at an angle to the longitudinal axis of the member 13. The arrangement is such that when the rod 43 is moved in the longitudinal direction, the surfaces 54 acting through the arms 51 tilt the roller carriers 17, and hence the rollers 15, about an axis extending through the points of contact of the rollers with the members 21 and 22. As previously set forth, this tilting of the rollers effects automatically a precessional movement between the positions A and B, the direction of the precessional movement depending upon the direction in which the roller is tilted. The precessional movement resulting from any tilting of the rollers is directly proportional as a matter of magnitude to the extent to which the roller has been tilted in the manner described. This is due to the fact that the precessional movement resulting from the tilting causes a movement of the roller about the tilting axis in a reverse direction to the original tilt, so that as the precessional movement progresses, the roller is progressively returned towards its original and normal position with respect to the axis of tilt, this restoration of the roller into its normal position automatically interrupting the precessional movement. This action is illustrated in Figs. 5, 6, and 7. In Fig. 5, the cam 54 and shoe 53 are shown in the normal relative position corresponding for example to their positions in Fig. 3. In Fig. 6, the cam has been adjusted to initiate a precessional movement of the roller, the direction of adjustment of the cam being indicated by the arrow and the original position of the cam, corresponding to that of Fig. 5, being shown in broken lines. It will be apparent by reference to Fig. 3 that this adjustment of the cam must necessarily result in a tilting of the roller about an axis through the points of contact thereof with the disks 21 and 22, it being kept in mind that the roller carrier through the two connected arms 51 is confined between the two parallel and oppositely placed and synchronized cams 54 as previously described. The tilting of the roller effected by the adjustment of the cams 54 causes the rollers to precess between the disks 21 and 22, and this precessional movement results necessarily in a follow-up movement of the shoes 53 on the cams to the position shown in Fig. 7 wherein the shoes and cams occupy the same relative positions in which they are shown in Fig. 5. This follow-up movement results in a readjustment of the roller about the points of contact thereof with the disks 21 and 22 to an extent rectifying the original tilt so that the normal relation between the roller and disks with respect to the axis of tilt is restored and the precessional movement accordingly interrupted.

In the present instance, the adjustment of the rod 43 is effected automatically in accordance with the torque requirement imposed by the load upon the output shaft 2. To this end, a spring 55 is interposed between the shaft elements 3 and 5 and exerts pressure tending continuously to force the element 3 outwardly or to the right, as viewed in Fig. 1, with respect to the element 5. When the shaft 1 is rotated from the power source, there is a tendency for the shaft element 3, by reason of its threaded engagement with the element 5, to move axially against the pressure of the spring 55 and toward the left, as viewed in Fig. 1, with the result that the rod 43 is adjusted inwardly. This inward adjustment of the rod 43 tilts the rollers 15 in a direction to cause precessional movement of the rollers 15 towards the A or low-speed position in which the transmission mechanism is adapted to deliver a maximum torque to the driven shaft 2. When the roller occupies this low-speed position, the rod 43 has been advanced to the maximum extent toward the left. As the torque requirements of the output shaft 2 decrease, the spring 55 will tend to return the shaft element 3 and the rod 43 toward the original or extended position, with the result that the rollers 15 are precessed automatically toward the high-speed position B, wherein as previously described, the movable parts of the transmission mechanism rotate as a unit, with a resultant direct drive connection between the input and output shafts.

In order that the mechanism may operate as described above, it is necessary to provide means for preventing or limiting rotation of the housing 7 in a direction reverse to the normal direction of rotation of the input shaft 1 while permitting rotation of the housing in the opposite direction. This is accomplished by means of an overrunning clutch (not shown) which in the present instance is associated with the end member 56 of the housing 7. By reason of this device, the housing and the member 21 which is connected thereto through the key 23 as previously described form a reaction member upon which the rollers 15 may track when occupying positions other than the high-speed position B. In other words, under conditions of indirect drive, the member 21 constitutes a fixed track for the rollers through the medium of which the rollers may impose a turning torque upon the member 22. This transmission mechanism and its mode of operation insofar as described are fully disclosed in my aforesaid copending application, and are described herein solely for the purpose of affording a more adequate basis for disclosure of the subject-matter of the present invention.

Assuming now that the input shaft 1 is rotating at a constant speed and that the rollers are in the low-speed or A position, it will be apparent that the member 21 being stationary, the member 22 will be rotated by action of the rollers 15 at a relatively low speed, and that the speed of rotation of the member 22 will increase to a maximum as the rollers approach the direct drive position B. Also the speed of rotation of the rollers about their individual axes will be at a minimum in the A position, and will progressively increase to a maximum when the roller is about to enter the direct drive position B. Since the gyroscopic forces are a result of the dual movement of the rollers 15, first about their individual axes, and secondly in the rotation of these individual axes around the axis of the member 13, it will be apparent that these gyroscopic forces increase from a minimum when the rollers occupy the position A to a maximum when the rollers are about to move into the position B. When the rollers have moved into the position B, it will be apparent also that the gyroscopic forces cease by reason of the fact that in this direct drive position the rotation of the rollers about their individual axes ceases, and the sole movement of the rollers then is their movement in the orbital path about the axis of the member 13. When, therefore, the gyroscopic forces are at a minimum, the rotative speed of the member 22 is also at a minimum, and the weights 36 occupy positions relatively close to the axis of the member 22, so that the centrifugal force applied to the bell crank levers 34 through the weights 36 is also at a minimum; and similarly when the gyroscopic forces are at a maximum just prior to the movement of the rollers 15 into the B position, the rotative speed of the member 22 is at a maximum, as also is the radial distance of the weights 36 from the rotational axis of the member 22, so that the centrifugal forces applied through the weights 36 to the bell crank levers 34 are also at a maximum. As previously set forth, the gyroscopic forces tend to move the rollers 15 toward the low-speed position A, and it is apparent that these forces are opposed at all times by the centrifugal force of the weights 36 applied through the bell cranks 34, the plungers 33, the member 29 and the arms 31 upon the carriers 17. The arrangement is such, as described above, that as the gyroscopic forces increase so also do the centrifugal forces acting in opposition to the gyroscopic force to maintain the rollers 15 in their normal adjusted positions, so that there is in effect an automatic synchronization of the opposed forces making possible under all conditions a substantial neutralization of the one force by the other.

By this cancellation of the effects of the gyroscopic forces set up in the rotary planetary assembly, it is possible to reduce the pressures under which the rollers are confined between the members 21 and 22 to a minimum consistent with the torques for transmission of which the mechanism is designed and with the necessity for preventing slippage between the rollers and the roller-engaging members 21 and 22 under the normal torque load. The device avoids the necessity for employing pressures sufficient to prevent slippage between the rollers and the members 21 and 22 under the excessively high forces arising from the gyroscopic action.

While I do not claim broadly a means in a mechanism of this character for neutralizing the gyroscopic forces set up in the planetary assembly by centrifugal force, I am, so far as I am aware, the first to provide a device of this character wherein the relation between the variable gyroscopic forces and the opposing centrifugal force is maintained at a substantial constant. The invention is of special significance in that type of rolling adhesion planetary assembly wherein the torques are applied from the power source directly through the planetary members, or wherein in other words, the planetary members are driven directly from or are connected to the input shaft.

I claim:

1. In a planetary rolling-adhesion transmission mechanism, the combination with a rotary member, of a planetary torque-transmitting roller having tractive contact with said member, and centrifugal means including an actuating weight movably mounted in said member for exerting a force upon the roller in opposition to the gyroscopic forces generated in said roller as a result of the planetary movement.

2. In a planetary rolling-adhesion transmission mechanism, the combination with a planetary torque-transmitting roller, of rotary means in tractive contact with said roller, and centrifugal means actuated by rotation of said rotary means for exerting a force upon the roller in opposition to the gyroscopic forces generated in said roller as a result of the planetary movement.

3. In a planetary rolling-adhesion transmission mechanism, the combination with a planetary torque-transmitting roller and means for supporting said roller, of a member independent of said roller and said supporting means adapted to rotate in synchronism with the orbital movement of said roller, and centrifugal means including an actuating weight mounted on said member for exerting a force upon the roller in opposition to the gyroscopic forces generated in said roller as a result of the planetary movement.

4. In a planetary rolling-adhesion transmission mechanism, the combination with a driving shaft, of a planetary torque-transmitting roller carried by said shaft, rotary means in tractive contact with said roller, and centrifugal means actuated by rotation of said rotary means for exerting a force upon the roller in opposition to the gyroscopic forces generated in said roller as a result of the planetary movement.

5. In a planetary rolling-adhesion transmission mechanism, the combination with a driving shaft, of a planetary torque-transmitting roller carried by said shaft, members at opposite sides of and in tractive contact with said roller, one at least of said members being adapted for rotation by the roller, and centrifugal means including an actuating weight mounted on said rotary member for exerting a force upon the roller in opposition to the gyroscopic forces generated in said roller as a result of the planetary movement.

6. In a planetary rolling-adhesion transmission mechanism, the combination with a driving shaft, of a planetary torque-transmitting roller carried by said shaft, members at opposite sides of and in tractive contact with said roller, one of said members being adapted to constitute a fulcrum for said roller against which the latter may react in driving the other member, and centrifugal means including an actuating weight mounted on the last-named member for exerting a force upon the roller in opposition to the gyroscopic forces generated in said roller as a result of the planetary movement.

7. In a planetary rolling-adhesion transmission mechanism, the combination with a planetary torque-transmitting roller, of rotary means in tractive contact with said roller, a weight mounted in said rotary means and movable therein by centrifugal force, and means for operatively connecting said weight with the roller whereby the centrifugal force acting upon the latter through the weight may oppose the gyroscopic forces generated in said roller as a result of the planetary movement.

8. In a planetary rolling-adhesion transmission mechanism, the combination with a planetary torque-transmitting roller, of a carrier for said roller, a member independent of said roller and said supporting means adapted to rotate in synchronism with the orbital movement of said roller, and centrifugal means including an actuating weight mounted on said member, and means for operatively connecting said weight with the roller whereby the centrifugal force acting upon the latter through the weight may oppose the gyroscopic forces generated in said roller as a result of the planetary movement, said connecting means comprising an arm on the roller carrier, a member mounted for axial movement in engagement with said arm, and a bell crank lever operatively connecting said axially movable member with the weight.

9. In a planetary rolling-adhesion transmission mechanism, the combination with a planetary torque-transmitting roller, of members at opposite sides of and in tractive contact with said roller and formed to provide for said roller a toroidal race, one at least of said members being adapted for rotation, means for adjusting the roller between the members to vary the transmission, and centrifugal means including a weight mounted on said rotary member for exerting a force upon the roller in opposition to the gyroscopic forces generated in said roller as a result of the planetary movement.

10. In a planetary rolling-adhesion transmission mechanism, the combination with a driving shaft, of a planetary torque-transmitting roller carried by said shaft, members at opposite sides of and in tractive contact with said roller and shaped to form a toroidal race for said roller, one at least of said members being adapted for rotation, means for adjusting the roller between the members to vary the transmission, and centrifugal means including an actuating weight mounted on said rotatable member for exerting a force upon the roller in opposition to the gyroscopic forces generated in said roller as a result of the planetary movement.

JOHN S. SHARPE.